Feb. 6, 1951  F. S. SAUNDERS  2,540,176
PRESSURE GAUGE
Filed May 7, 1947  3 Sheets-Sheet 1
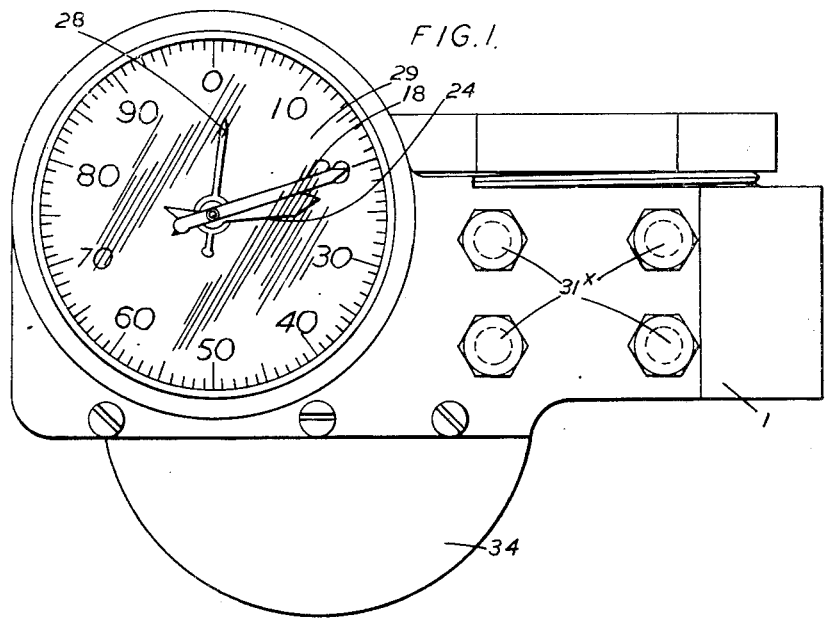
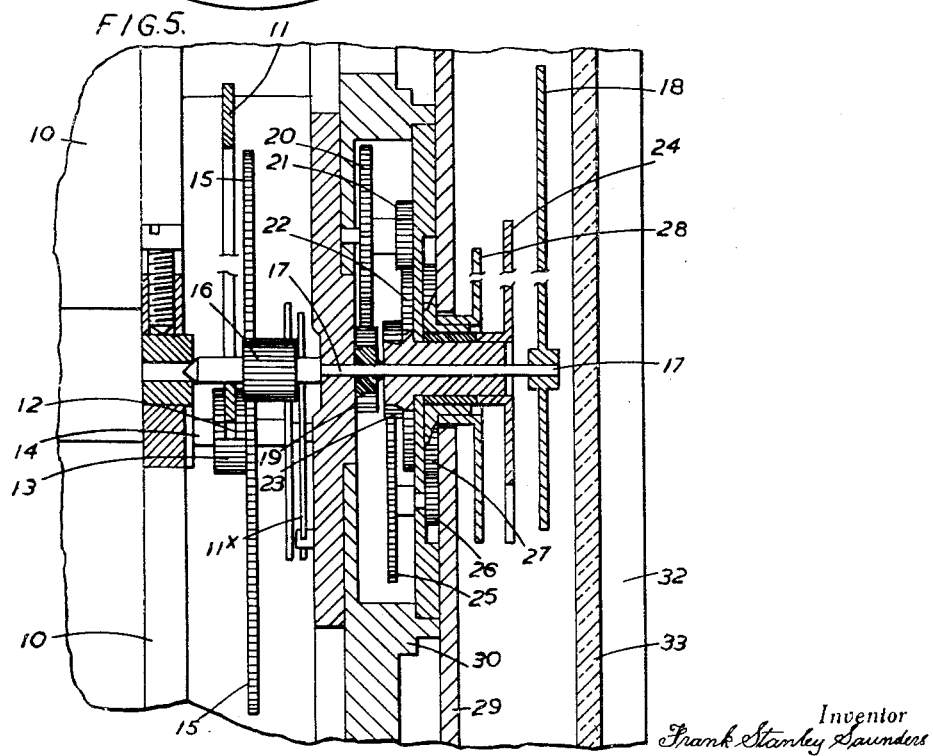
Inventor
Frank Stanley Saunders
By
A. Knight Croad
Attorney Feb. 6, 1951      F. S. SAUNDERS      2,540,176

PRESSURE GAUGE

Filed May 7, 1947      3 Sheets-Sheet 2

Inventor
Frank Stanley Saunders.
By
A. Knight Croad
Attorney

Feb. 6, 1951 F. S. SAUNDERS 2,540,176
PRESSURE GAUGE
Filed May 7, 1947 3 Sheets-Sheet 3

Inventor
Frank Stanley Saunders.
By
A. Knight Croad
Attorney

Patented Feb. 6, 1951

2,540,176

UNITED STATES PATENT OFFICE 2,540,176

PRESSURE GAUGE

Frank Stanley Saunders, Keynsham, near Bath, England

Application May 7, 1947, Serial No. 746,522
In Great Britain February 11, 1947

1 Claim. (Cl. 73—415)

This invention relates to gauges and like instruments for indicating loads or pressures and it has for its object the provision of an instrument by means of which it is possible to obtain highly magnified readings for very small movements.

The invention will be described with particular reference to its application to a weighing machine of the type described and claimed in the specification to my prior British Patent No. 564,287, but it is to be understood that the invention is not limited in its application to such machines.

According to this invention it is proposed to utilize mechanism of high magnification gearing and continuous reading hands, said gearing being coupled with a Bourdon tube, one end of which is rigidly connected to the pressure instrument while the other end is connected by means of linkage to the gauge.

In the accompanying drawing which illustrates the application of the invention to a weighing machine of the type described in my aforesaid pending application:

Figure 1 is a front elevation of the dial of the gauge.

Figure 5 is a similar view to Figure 4 of the indicator gearing drawn to a still larger scale.

Figure 2:
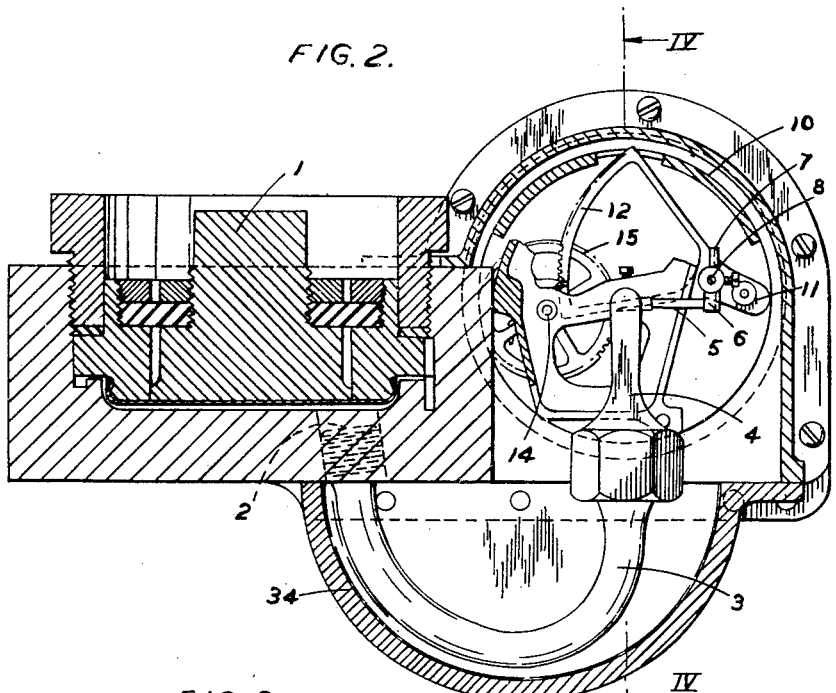
Figure 2 is a section of line II—II of Figure 3.
Figure 3:
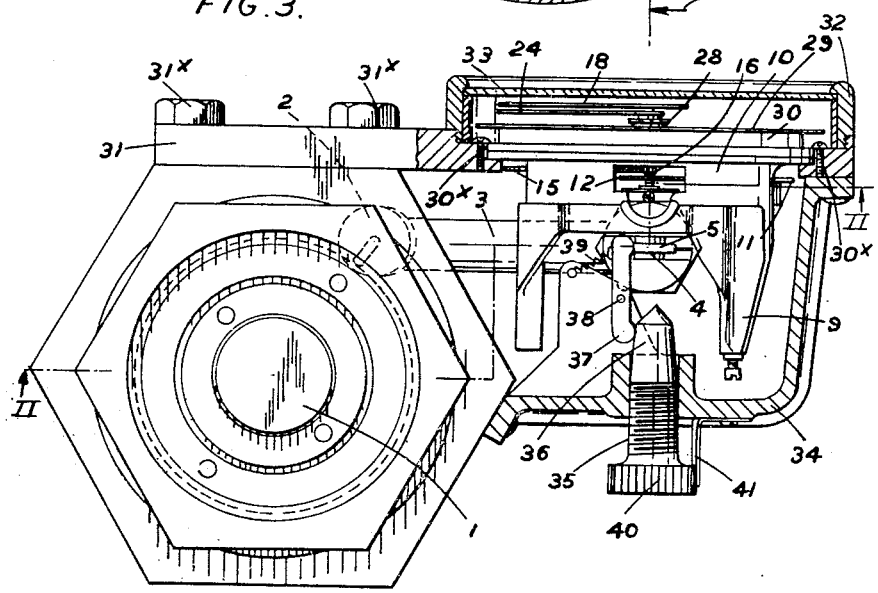
Figure 3 is a plan view of the weighing machine, with a central section through the casing of the indicator.
Figure 4:
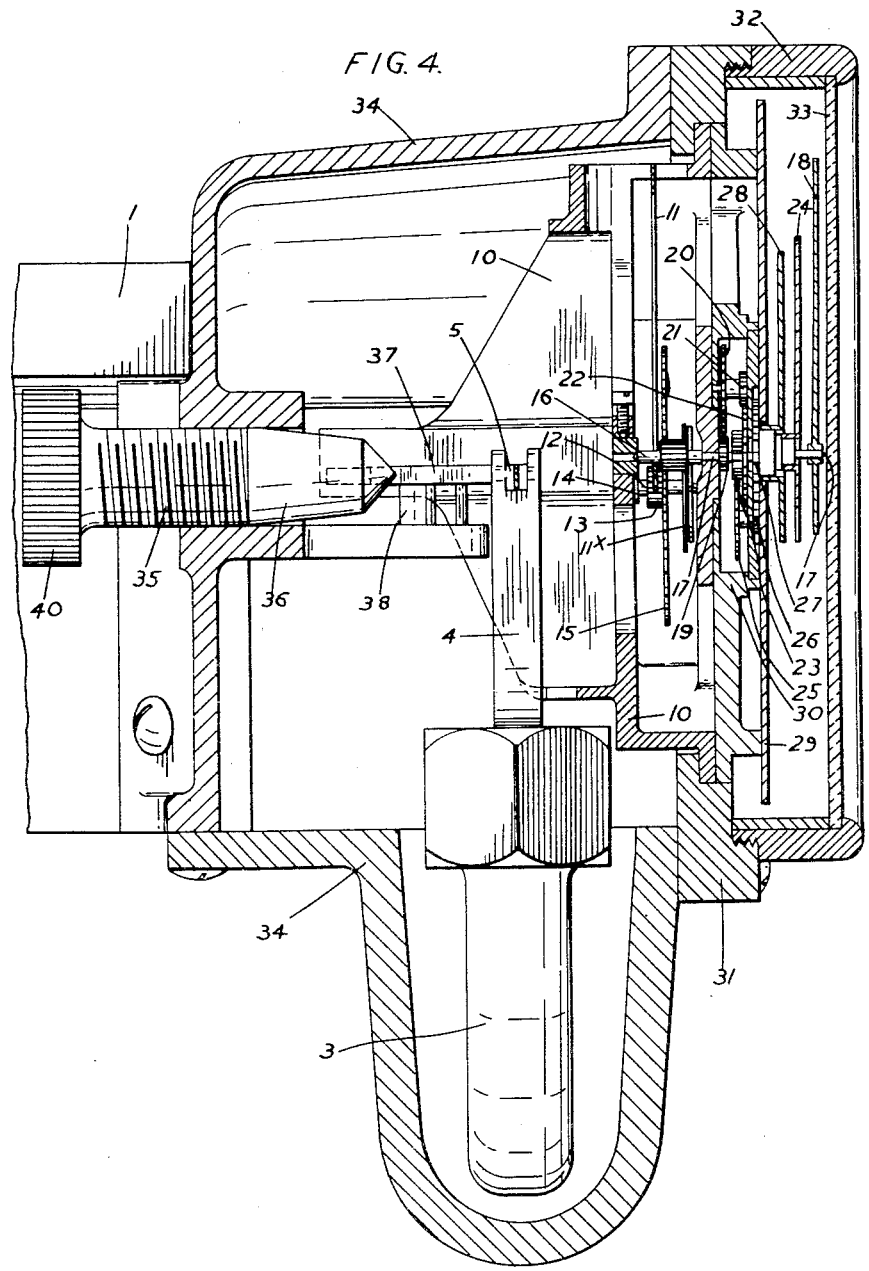
Figure 4 is a vertical section on line IV—IV of Figure 2.

In the embodiment illustrated in the drawings, 1 is a weighing machine having the characteristic features of the machine described in the specification to my aforesaid prior application, with the exception that whereas the outlet 2 to which one end of the Bourdon tube 3 is connected is located in the base of the weighing machine as shown in Figure 2. The other end of the Bourdon tube is connected to a part 4, the free end of which is pivotally connected to one end of a link 5 the opposite end of which is pivotally connected at 6 to one end of a pin 7 adjustably mounted on a spindle 8 pivotally mounted in a pillar 9 forming part of the interior casting 10 of the gauge. A quadrant shaped element 11 is secured on the spindle 8, the toothed portion 12 of which engages with a toothed pinion 13 secured on a spindle 14 to which is also secured a toothed wheel 15 which meshes with a pinion 16 secured on the spindle 17 on the outer end of which is secured the hand 18. A pinion 19 on the spindle 17 meshes with a toothed wheel 20 provided with a pinion 21 meshing with a toothed wheel 22 provided with a pinion 23 to which is secured the hand 24. The pinion 23 meshes with the toothed wheel 25 provided with a pinion 26 which meshes with a toothed wheel 27 to which is secured the hand 28.

When the load is removed from the machine the quadrant element 11 is returned to its normal position by a hair spring 11$^x$.

The gauge is provided with a dial plate 29 secured to the part 30 of the casting, which together with the part 10 embodying the gauge mechanism is secured by the screws 30$^x$ to a plate 31 secured to the body of the weighing machine 1 by studs 31$^x$. The front of the gauge is enclosed by a ring part 32 by means of which the cover glass 33 is secured in position, said ring part 32 being screwed into a recess in the plate 31 while the remainder of the gauge mechanism is enclosed in a casing 34 which is also secured to the body of the weighing machine.

As it is essential that the gauge should be provided with means for setting the hands at the zero position, the casing 34 is provided with means for supporting a set screw 35 provided with a tapered inner end 36 against which one end of a lever 37, pivoted on a pin 38, is caused to bear, the other end of said lever is arranged to bear against the upper end of the part 4 of the Bourdon tube 3. A spring 39 serves to maintain the lever 37 against the tapered end 36 of the set screw, the arrangement being such that when the screw 35 is moved inwardly the end of the Bourdon tube and thereby the link 5 are moved outwardly thereby imparting the desired movement to the spindle 8 and thereby to the train of gears effecting the rotation of the hands 18, 24 and 28. The set screw 35 is preferably provided with a serrated head 40 with which a spring finger 41 is arranged to coact to prevent accidental movement of the screw after setting.

In operation, assuming that the three hands of the gauge have been set to zero, and that a load or pressure is applied to the weighing machine or other pressure device, the pressure on the fluid in the latter is transmitted to the Bourdon tube which tends to straighten and a partial rotative movement is imparted to the spindle 8 thereby setting the train of gearing of the gauge in motion, the hand 18 rotates very rapidly. When this hand has made one revolution the hand 24 will have made one tenth of a revolution which indicates a load or pressure of 1,000 lbs. When the hand 24 has made a complete revolution this will indicate a load or pressure of 10,000 lbs. and the hand 28 will have moved from zero to 10 or one tenth way round the dial.

What I claim is:

In a device for measuring loads, pressures and the like which includes a Bourdon tube adapted to move under the action of a fluid under pressure therewithin, means for setting the indicating hands which indicate the measured load, pressure, and the like at the zero position, said means comprising a set screw mounted in a casing, said set screw being formed with a tapered inner end, and a lever pivotally mounted on said casing, one end of said lever being positioned to bear against said tapered inner end of said set screw, and the other end of said lever being positioned to bear against the closed end of said Bourdon tube.

FRANK STANLEY SAUNDERS.

REFERENCES CITED

The following references are of record in the file of this patent:

UNITED STATES PATENTS

| Number | Name | Date |
|---|---|---|
| 1,354,447 | Troll | Sept. 28, 1920 |
| 1,507,242 | Meriam | Sept. 2, 1924 |
| 1,893,858 | Carlson | Jan. 10, 1933 |
| 2,325,282 | Schwenn | July 27, 1943 |
| 2,392,702 | Saunders | Jan. 8, 1946 |

FOREIGN PATENTS

| Number | Country | Date |
|---|---|---|
| 128,051 | France | Dec. 21, 1878 |